United States Patent
Makam et al.

(10) Patent No.: US 12,519,380 B2
(45) Date of Patent: Jan. 6, 2026

(54) PERMANENT MAGNET MOTOR WITH DYNAMIC MAGNET ORIENTATIONS

(71) Applicant: FCA US LLC, Auburn Hills, MI (US)

(72) Inventors: Sandeep Makam, Rochester Hills, MI (US); Ahmet Yasin Yeksan, Livonia, MI (US); Pradeep Attibele, Ann Arbor, MI (US); Donald F Schmanski, Howell, MI (US)

(73) Assignee: FCA US LLC, Auburn Hills, MI (US)

( * ) Notice: Subject to any disclaimer, the term of this patent is extended or adjusted under 35 U.S.C. 154(b) by 219 days.

(21) Appl. No.: 18/508,432

(22) Filed: Nov. 14, 2023

(65) Prior Publication Data

US 2024/0162795 A1 May 16, 2024

Related U.S. Application Data

(60) Provisional application No. 63/425,471, filed on Nov. 15, 2022.

(51) Int. Cl.
*H02K 1/27* (2022.01)
*H02K 21/02* (2006.01)

(52) U.S. Cl.
CPC ................. *H02K 21/028* (2013.01)

(58) Field of Classification Search
CPC .. H02K 1/02; H02K 1/12; H02K 1/24; H02K 1/246; H02K 1/27; H02K 1/2706; H02K 1/276; H02K 1/2766; H02K 1/277; H02K 1/2773; H02K 1/2781; H02K 1/2795;
(Continued)

(56) References Cited

U.S. PATENT DOCUMENTS

| 6,965,212 B1 | 11/2005 | Wang et al. |
| 7,723,889 B2 | 5/2010 | Kusase et al. |
| 7,791,295 B2 | 9/2010 | Oi et al. |

(Continued)

FOREIGN PATENT DOCUMENTS

JP    2004222350 A   *  8/2004  ........... H02K 1/2766

OTHER PUBLICATIONS

Young Hyun Kim et al., "Study on Optimal Design of 210KW Traction IPMSM Considering Thermal Demagnetization Characteristics", Department of Electrical Engineering, Hanbat National University, pp. 1-31.

*Primary Examiner* — Tran N Nguyen
(74) *Attorney, Agent, or Firm* — Jeremy J. Klobucar

(57) ABSTRACT

A permanent magnet motor includes a rotor configured to rotate about a stator axis and having N pairs of permanent bar magnets each arranged therein and in a V-angle configuration defining a V-angle ($\theta$) therebetween and corresponding to one of N rotor poles, wherein N is greater than one. An adjustment system is configured to adjust the V-angle between each pair of the N pairs of permanent bar magnets between at least a first V-angle ($\theta_1$) and a different second V-angle ($\theta_2$). A controller is configured to control the permanent magnet motor and the adjustment system to (i) mitigate noise, vibration, and/or harshness (NVH) of the permanent magnet motor and (ii) improve efficiency of the permanent magnet motor at high speed operating regions or improve torque of the permanent magnet motor at low speed operating regions.

20 Claims, 5 Drawing Sheets

(58) Field of Classification Search
CPC ........ H02K 1/28; H02K 21/02; H02K 21/021; H02K 21/028; H02K 21/14; H02K 21/24
See application file for complete search history.

(56) References Cited

U.S. PATENT DOCUMENTS

| | | |
|---|---|---|
| 8,072,108 B2 | 12/2011 | Finkle et al. |
| 10,581,287 B2 * | 3/2020 | Swales ................. H02K 1/2766 |
| 11,005,320 B2 * | 5/2021 | Krizan .................... B60L 15/02 |
| 2013/0187504 A1 * | 7/2013 | Tanaka ................. H02K 1/2706 |
| | | 310/156.01 |
| 2019/0207446 A1 * | 7/2019 | Swales ................... H02K 16/02 |

* cited by examiner

PERMANENT MAGNET MOTOR WITH DYNAMIC MAGNET ORIENTATIONS

CROSS-REFERENCE TO RELATED APPLICATION(S)

The present application claims the benefit of U.S. Provisional Application No. 63/425,471, filed on Nov. 15, 2022. The disclosure of this application is incorporated herein by reference in its entirety.

FIELD

The present application generally relates to electric motors and, more particularly, to a permanent magnet motor with dynamic magnet orientations and a method of operating/controlling the same.

BACKGROUND

In today's vehicles, electric motors are often utilized as a part of a torque generating system. The electric motor(s) could either be a portion of a torque generating system (e.g., a hybrid powertrain configuration with an internal combustion engine) or the entire torque generating system (e.g., an electrified powertrain with only one or more electric motors). Interior permanent magnet synchronous motors (IPMSMs) are one of the most desirable choices for vehicle applications due to their high torque output. Recent trends continue pushing motors to even greater speeds (e.g., ~30,000 revolutions per minute, or RPM) and field weakening control is utilized beyond the constant-torque output region of the motor performance map. The high currents utilized during field weakening control, particularly at very high motor speeds, increase heat generation and decrease motor efficiency, which can be seen in the plot of FIG. 1. In addition, motor noise/vibration/harshness (NVH) typically increases across all speed ranges. Accordingly, while such conventional electric motor systems and their operation/control methods do work well for their intended purpose, there exists an opportunity for improvement in the relevant art.

SUMMARY

According to one example aspect of the invention, an electric motor system for a vehicle is presented. In one exemplary implementation, the electric motor system comprises a permanent magnet motor comprising a stator defining a stator axis and having a plurality of electromagnetic coils each configured to, in response to a current, generate a magnetic field, and a rotor having N pairs of permanent bar magnets arranged therein and configured to rotate about the stator axis in response to the generated magnetic field(s), wherein each pair of the N pairs of permanent bar magnets are arranged in a V-angle configuration defining a V-angle ($\theta$) therebetween and corresponding to one of N rotor poles, and wherein N is greater than one, an adjustment system configured to adjust the V-angle between each pair of the N pairs of permanent bar magnets between at least a first V-angle ($\theta1$) and a different second V-angle ($\theta2$), and a controller configured to control the permanent magnet motor and the adjustment system based on a desired speed and desired torque for the electric motor system to (i) mitigate noise, vibration, and/or harshness (NVH) of the permanent magnet motor and (ii) improve efficiency of the permanent magnet motor at high speed operating regions or improve torque of the permanent magnet motor at low speed operating regions.

In some implementations, the adjustment system includes a hydraulic system where a pressure of a hydraulic fluid selectively actuates one or more hydraulic actuators to adjust the V-angle $\theta$ between a particular pair of the N pairs of permanent bar magnets. In some implementations, when actuated, the one or more hydraulic actuators move the particular pair of permanent bar magnets from the first V-angle $\theta1$ to the second V-angle $\theta2$, and wherein the adjustment system further includes a pair of return springs that, when the one or more hydraulic actuators are not actuated, move the particular pair of permanent bar magnets from the second V-angle $\theta2$ back to the first V-angle $\theta1$, balanced by centrifugal forces at an operating speed of the rotor. In some implementations, the adjustment system is configured to adjust the V-angle between each pair of the N pairs of permanent bar magnets between three or more different angles. In some implementations, the three or more different angles allow for the adjustment system to achieve at least one asymmetric pair of rotor poles. In some implementations, the N pairs of permanent bar magnets are arranged in (N*2) respective cavities defined by the rotor, wherein each cavity is filled with air, the hydraulic fluid, or a combination thereof.

In some implementations, the controller is further configured to access a look-up table relating (i) a plurality of combinations of direct current commands (Id), quadrature current commands (Iq), and V-angles for achieving the desired speed and torque by the electric motor system and (ii) for each of the plurality of combinations, an expected NVH of the permanent magnet motor, select, from the look-up table, one of the plurality of Id/Iq/$\theta$ combinations corresponding to a reduced NVH of the permanent magnet motor, and control the permanent magnet motor and the adjustment system based on the selected Id/Iq/$\theta$ combination. In some implementations, during high speed operation of the permanent magnet motor above a speed threshold, the controller is configured to select and utilize the selected Id/Iq/$\theta$ combination to reduce an overall effective magnetic field of the permanent magnet motor and thereby reduce field weakening control by the direct current command Id and increase the efficiency of the permanent magnet motor, and output torque commensurately. In some implementations, during low speed operation of the permanent magnet motor below a low speed threshold, the controller is configured to select and utilize the selected Id/Iq/$\theta$ combination to increase the torque generated by the permanent magnet motor. In some implementations, the controller is configured to increase the torque generated by the permanent magnet motor during the low speed operation.

According to another example aspect of the invention, a method for dynamic control of orientations of permanent bar magnets arranged in a rotor of a permanent magnet motor of a vehicle is presented. In one exemplary implementation, the method comprises providing a permanent magnet motor comprising a stator defining a stator axis and having a plurality of electromagnetic coils each configured to, in response to a current, generate a magnetic field and a rotor having N pairs of permanent bar magnets arranged therein and configured to rotate about the stator in response to the generated magnetic field(s), wherein each pair of the N pairs of permanent bar magnets are arranged in a V-angle configuration defining a V-angle ($\theta$) therebetween and corresponding to one of N rotor poles, and wherein N is greater than one, providing an adjustment system configured to adjust the V-angle θ between each pair of the N pairs of permanent bar magnets between at least a first V-angle (θ1) and a different second V-angle (θ2), and controlling, by a controller of the vehicle, the permanent magnet motor and the adjustment system based on a desired speed and desired torque for the electric motor system to (i) mitigate NVH of the permanent magnet motor and (ii) improve efficiency of the permanent magnet motor at high speed operating regions or improve a torque generated by the permanent magnet motor at low speed operating regions.

In some implementations, the adjustment system includes a hydraulic system where a pressure of a hydraulic fluid selectively actuates one or more hydraulic actuators to adjust the V-angle θ between a particular pair of the N pairs of permanent bar magnets. In some implementations, when actuated, the one or more hydraulic actuators move the particular pair of permanent bar magnets from the first V-angle θ1 to the second V-angle θ2, and wherein the adjustment system further includes a pair of return springs that, when the one or more hydraulic actuators are not actuated, move the particular pair of permanent bar magnets from the second V-angle θ2 back to the first V-angle θ1, balanced by centrifugal forces at an operating speed of the rotor. In some implementations, the adjustment system is configured to adjust the V-angle between each pair of the N pairs of permanent bar magnets between three or more different angles. In some implementations, the three or more different angles allow for the adjustment system to achieve at least one asymmetric pair of rotor poles. In some implementations, the N pairs of permanent bar magnets are arranged in (N*2) respective cavities defined by the rotor, wherein each cavity is filled with air, the hydraulic fluid, or a combination thereof.

In some implementations, the method further comprises accessing, by the controller, a look-up table relating (i) a plurality of combinations of direct current commands (Id), quadrature current commands (Iq), and V-angles for achieving the desired speed and torque by the electric motor system and (ii) for each of the plurality of combinations, an expected NVH of the permanent magnet motor, selecting, by the controller and from the look-up table, one of the plurality of Id/Iq/θ combinations corresponding to a reduced NVH of the permanent magnet motor, and controlling, by the controller, the permanent magnet motor and the adjustment system based on the selected Id/Iq/θ combination. In some implementations, during high speed operation of the permanent magnet motor above a speed threshold, the controller is configured to select and utilize the selected Id/Iq/θ combination to reduce an overall effective magnetic field of the permanent magnet motor and thereby reduce field weakening control by the direct current command Id and increase the efficiency of the permanent magnet motor, and output torque commensurately. In some implementations, during low speed operation of the permanent magnet motor below a low speed threshold, the controller is configured to select and utilize the selected Id/Iq/θ combination to increase the torque generated by the permanent magnet motor. In some implementations, the controller is configured to increase the torque generated by the permanent magnet motor during the low speed operation.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
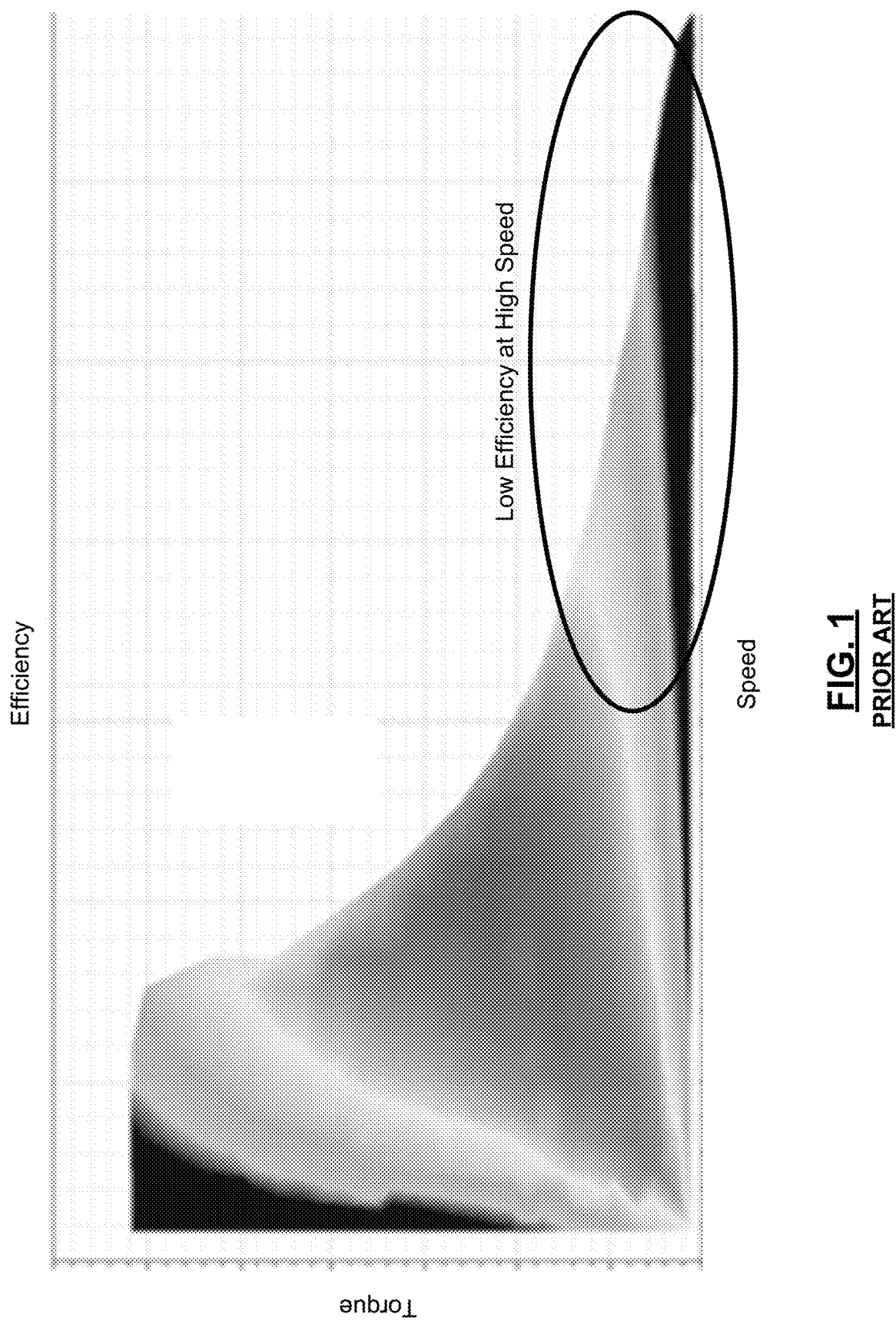
FIG. 1 is an example plot of motor efficiency versus motor speed for a permanent magnet motor according to the prior art.

As previously discussed, conventional vehicle electric motors (interior permanent magnet synchronous motors, or IPMSMs) suffer from excessive heat generation and decreased efficiency during high-speed operation (e.g., 30,000 revolutions per minute, or RPM) where field weakening control currents are high, which can be seen in the plot of FIG. 1. These conventional motors may also suffer from excessive noise/vibration/harshness (NVH) across all operating speed regions. These drawbacks are primarily due to the fact that, in conventional permanent magnet motors, the permanent magnets are fixed (e.g., via adhesives within the rotor core or lamination stack) in a specific orientation with respect to the rotational axis of the rotor. Accordingly, an improved electric motor system (including a permanent magnet motor and an adjustment system) and its method of operation/control are presented herein. The improved motor design allows the rotor permanent magnets to have a dynamically adjustable orientation with respect to the rotational axis. The dynamic adjustment of the magnet orientation can be achieved via hydraulics, mechanical components (e.g., springs), a combination thereof, or some other suitable type of adjustment system (e.g., pneumatics). It should be noted that the mechanical actuation of the permanent magnets (i.e., their orientations) will be at a slower rate than a rate at which the motor currents ($I_d$, $I_q$) can change, and that appropriate control techniques will need to be employed to manage this difference in response rates.

For example, active hydraulic flow/pressure control (e.g., via hydraulic actuators) in combination with passive mechanical components (e.g., return springs) provides a system capable of controlling the magnet orientation dynamically during motor operation. One potential benefit of this motor design includes decreased heat generation and increased efficiency, particularly at high-speed operation regions (i.e., motor speeds above a speed threshold). As previously discussed, the current/energy spent on field weakening control increases as motor/rotor speeds increase. This excess current/energy is not directly contributing to the torque generation, but instead returns to the source, thereby generating heat energy and adding to the inefficiency of the motor. Another potential benefit of this motor design is improved NVH across all motor speed regions, including improved torque output during low-speed operation (e.g., via the freedom to control an additional parameter—the permanent magnet orientation). For a given operating point (e.g., torque and speed), there is a unique combination of magnetizing and torque-generating currents that are used, which are commonly referred to as direct or $I_d$ and quadrature or $I_q$ currents, respectively. The operation at a particular ($I_d$, $I_q$) results in certain radial and tangential forces on the rotor/motor. The tangential forces are the torque generating component. The radial forces on the stator, on the other hand, can cause several NVH issues at specific speed ranges depending upon the motor design, which could be perceivable and unpleasant to the driver.

Figure 2:
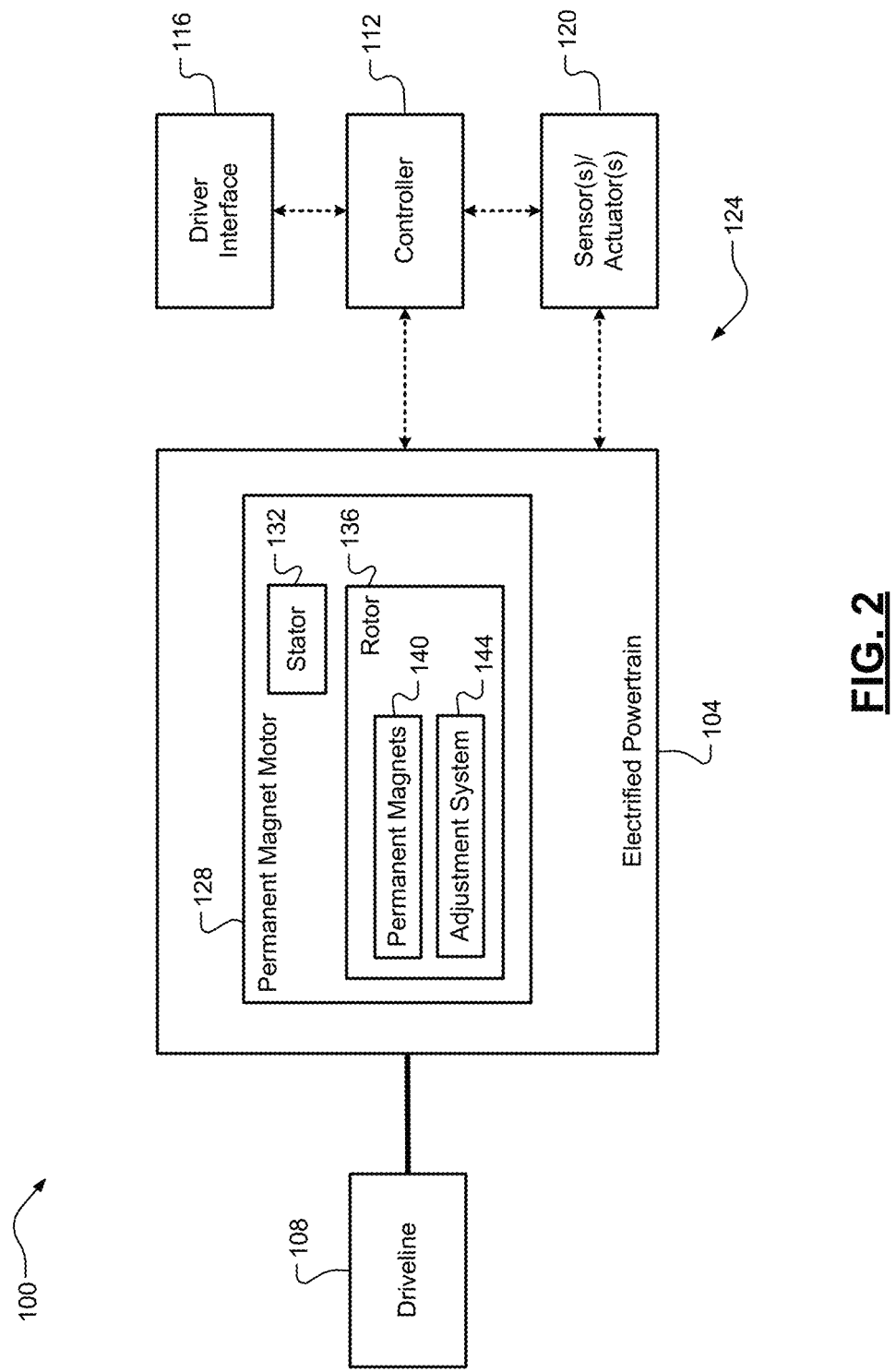
FIG. 2 is a functional block diagram of an electrified vehicle having an electrified powertrain with an example electric motor system according to the principles of the present application.

Referring now to FIGS. 2-3, a functional block diagram of an electrified vehicle 100 having an example electric motor system 124 and a cross-sectional view of a portion of a permanent magnet motor 128 and an adjustment system 144 according to some implementations of the present application are illustrated. The electrified vehicle 100 generally comprises an electrified powertrain 104 that generates a desired amount of drive torque (e.g., to satisfy a driver torque request provided via a driver interface 116) and transfers the drive torque to a driveline 108 for propulsion. A controller 112 controls operation of the electrified powertrain 104 (e.g., using actuator(s) 120), such as based on inputs via the driver interface 116 and other sensor(s) 120 to achieve a desired amount of drive torque at the electrified powertrain 104. The electric motor system 124 generally comprises the permanent magnet motor 128, the controller 112 (or another separate controller/control system), and the sensor(s)/actuator(s) 120. The electrified powertrain 104 only illustrates a single permanent magnet motor 128 (e.g., an IPMSM), but it will be appreciated that the electrified powertrain 104 could include additional components such as, but not limited to, an internal combustion engine, one or more additional electric motors (of the same or a different type), and a transmission.

Figure 3A:
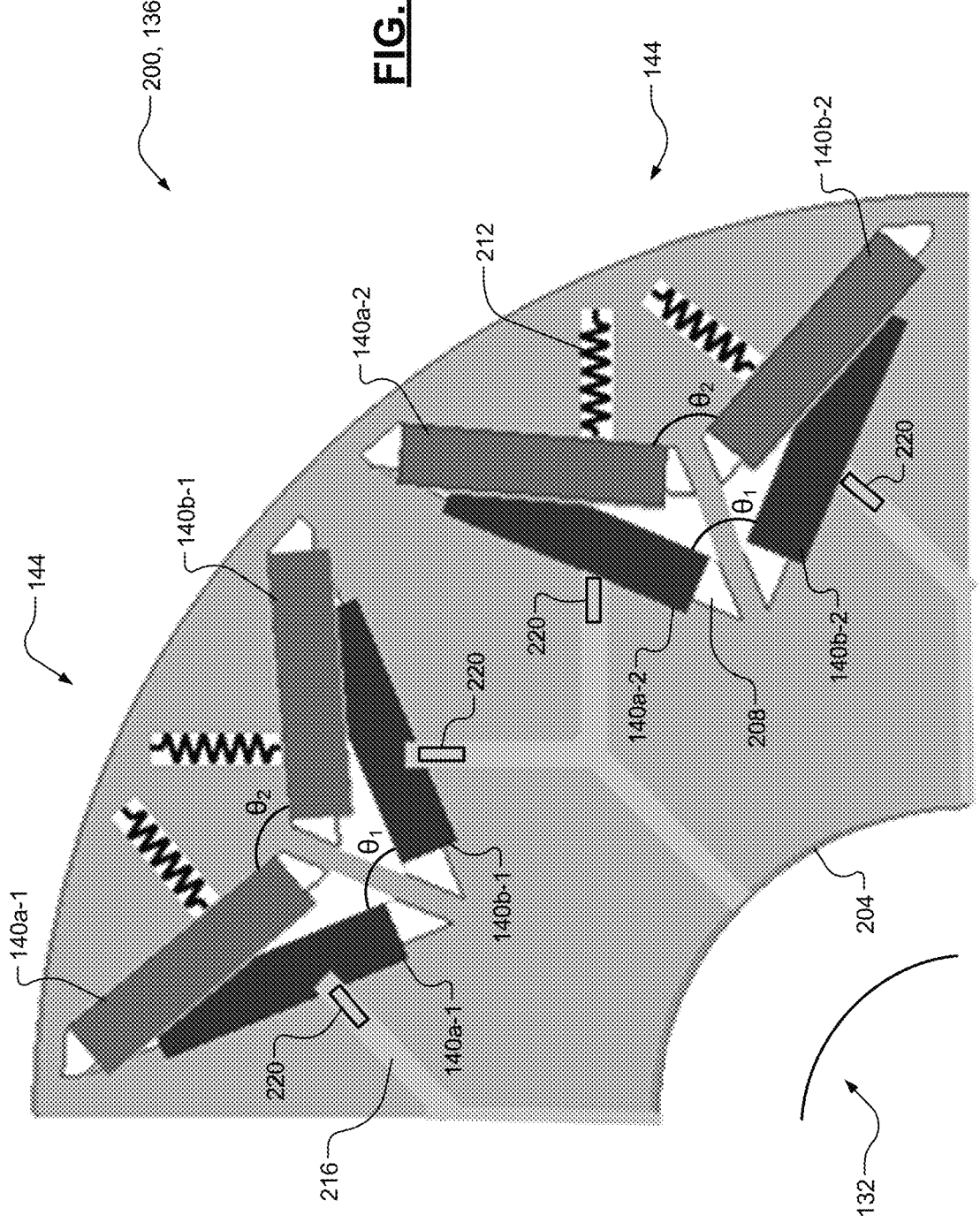
FIG. 3A is a cross-sectional diagram of a portion of an example permanent magnet motor configuration and an example adjustment system according to the principles of the present application.

Referring now to FIG. 3A and with continued reference to FIG. 2, a cross-sectional view of an example portion 200 of the permanent magnet motor 128 and the adjustment system 144 according to the principles of the present application. While shown in FIG. 2 as being part of the permanent magnet motor 128 (i.e., the rotor 136), the adjustment system 144 could exist at least partially outside of the rotor 136 or the permanent magnet motor 128 (e.g., a hydraulic fluid supply/pump external to the permanent magnet motor 128). The permanent magnet motor 128 generally comprises a stator 132 that generates magnetic fields (e.g., via electromagnetic coils (not shown) supplied with currents) that causes permanent magnets 140 of the rotor 132 to move and thereby turn/spin the rotor 132 to generate drive torque. As previously mentioned, a core 204 (e.g., stacks of laminations) of the rotor 132 typically has permanent magnets fixed therein (e.g., using adhesive) such that the permanent magnets are not movable. This is not the case, however, in the design of the permanent magnet motor 128 and the adjustment system 144 of the present application, where the permanent magnets 140 are movable within the core 204 of the rotor 132.

As shown, the permanent magnets 140 are typically divided into N pairs 140a-1 ... 140a-N and 140b-1 ... 140b-N (where N is an even integer greater than one and corresponding to a number of rotor poles). Each permanent magnet pair 140a, 140b is arranged in a "V-configuration" where a V-angle is defined therebetween. Each pair of permanent magnets 140a, 140b is also arranged within a respective cavity 208 defined in the core 204 of the rotor 132. As previously mentioned, the adjustment system 144 is configured to control/adjust orientation of the permanent magnets 140. In FIG. 3A, a specific configuration of the adjustment system 144 is illustrated, which includes a combination of hydraulics and mechanical devices as previously mentioned. More specifically, hydraulic fluid flows through hydraulic lines 208 and the hydraulic fluid pressure is controlled to adjust a force applied to the permanent magnets 140 such that they are movable within the respective cavities 208 between first positions (a first angle θ1) and second positions (a greater second angle θ2), or any position therebetween, with mechanical springs 212 providing an opposing return force. This movement or displacement of the permanent magnets 140 could be performed by hydraulic or actuators 220, such as linear piston-type hydraulic actuators, or other suitable types of actuators. These cavities 208 also act as magnetic flux barrier regions and could be filled at least partially with air and/or hydraulic fluid (e.g., oil). One alternative solution to hydraulic-based actuation for orientation control of the permanent magnets 140 would be centrifugal pendulum based orientation controls. It will be appreciated, however, that any other suitable orientation control systems could alternatively be utilized for the position/orientation control of the permanent magnets 140.

This motor, including the addition of the adjustment system 144, design solves the above-described problems (e.g., reduced efficiency at high operating speed regions, increased NVH across all operating speed regions, etc.) by dynamically setting the orientation of the adjustment system 144 (with respect to the rotational axis of the rotor 136) a specific V-angle that is optimized for the operating conditions at the moment. With respect to the first potential benefit, in high-speed operation (i.e., operation above a speed threshold), with this motor design, the orientation of the adjustment system 144 can be dynamically adjusted so that the overall or effective magnetic field that needs to be weakened by the current $I_d$ is reduced. This leads to improvement in motor efficiency and reduction in thermal load in the field weakening region because field weakening control provides for almost constant power at these high operating speed regions. This also increases the output torque commensurately. The concept of "field weakening control" for permanent magnet type motors involves adjusting the phase of the drive current to allow the permanent magnet motor 128 to be operated using a drive voltage that is less than a back electromotive force (EMF), which is proportional to a strength of a magnetic field across a gap between the stator 132 and the rotor 136.

Another potential benefit is NVH mitigation/control at all speeds, and improved torque output in low speed operation regions. With a variable magnet orientation, engineers are provided an additional degree of freedom to control and calibrate/tune the NVH of the motor. With such an arrangement, a given operating point (e.g., target speed/torque) can be achieved via numerous current combinations of $I_d$ and $I_q$ and orientations (θ1, θ2, etc.) of the adjustment system 144, as opposed to one unique $I_d$, $I_q$ current combination. This allows engineers to pick the best combination to minimize NVH and maximize torque output or efficiency as well as other functional objectives. This process could involve the controller 112 accessing a look-up table (e.g., stored in a local or remote memory) relating (i) a plurality of combinations of direct (d-axis) current $I_d$, quadrature (q-axis)

current $I_q$, and V-angles θ between each pair of the N pairs of permanent bar magnets 140a, 140b for achieving a desired speed and torque operating point for the permanent magnet motor 128 and (ii) for each of the plurality of combinations, an expected NVH of the permanent magnet motor 128. This look-up table could be predetermined or calibrated based on testing data. Using the accessed look-up table, the controller 112 could then select one of the plurality of combinations of ($I_d$, $I_q$, θ) corresponding to a lowest relative NVH of the permanent magnet motor 128 and either improved efficiency during high-speed operation (via mitigated field weakening control) or improved torque output during low-speed operation. In other words, the increased efficiency at high-speed operating regions and increased torque output at low-speed operating regions are trade-off benefits, whereas decreased or improved NVH is a benefit across all operating speed regions.

Figure 3B:
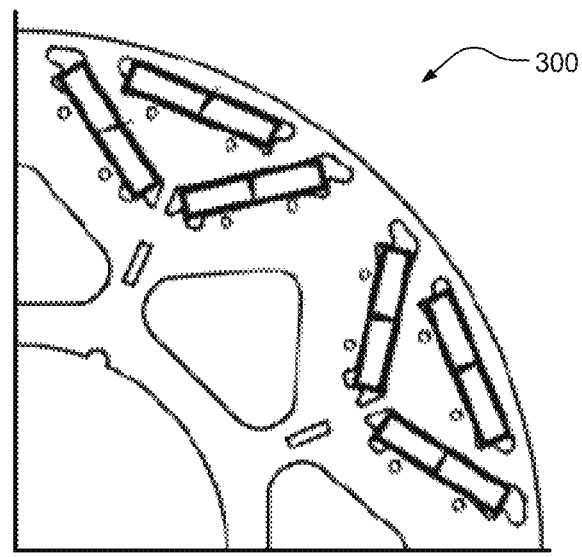
FIGS. 3B-3D are cross-sectional diagrams of portions of other example permanent magnet motor configurations according to the principles of the present application.
Figure 3C:
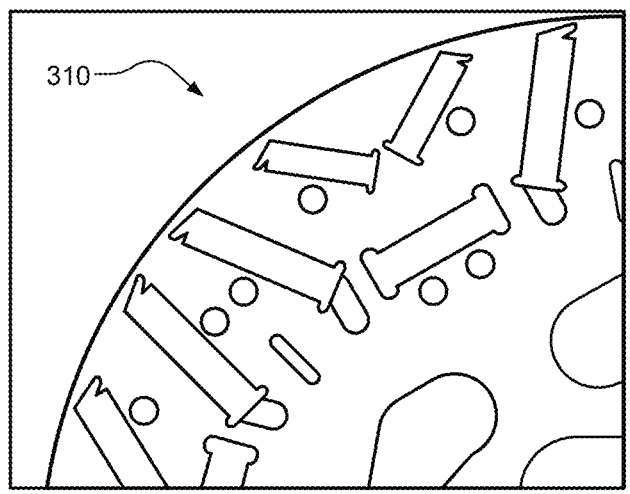
Figure 3D:
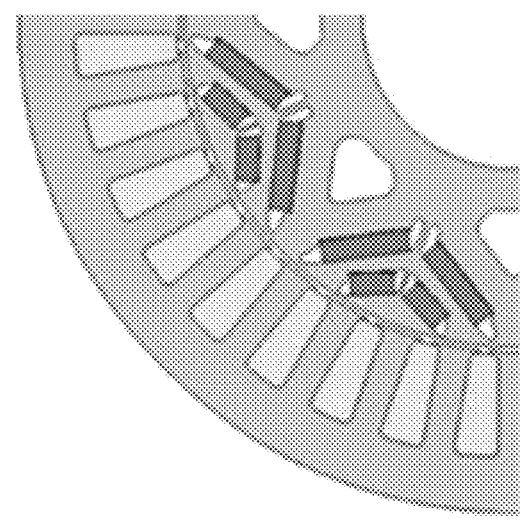

While one pair of permanent bar magnets 140a, 140b per pole of the N rotor poles is specifically shown and discussed herein, it will be appreciated that each rotor pole could include multiple pairs of permanent bar magnets 140 arranged in V-configurations. FIGS. 3B-3D, for example, illustrate cross-sectional diagrams of portions of other example permanent magnet motor configurations 300, 310, and 320 each having multiple pairs of permanent bar magnets 140 arranged in V-angle configurations according to the principles of the present application. The V-angle θ between each pair of permanent bar magnets 140 at each rotor pole could be adjustable by the adjustment system 144. This could include the same control of both pairs of permanent bar magnets 140, which could be the same V-angle θ from the same range of V-angles $θ_1$-$θ_2$, different V-angles $θ_a$, $θ_b$ (separately controllable) from the same range of V-angles $θ_1$-$θ_2$, or different V-angles (separately controllable) from different ranges of V-angles $θ_{a1}$-$θ_{a2}$ and $θ_{b1}$-$θ_{b2}$, respectively. The ability for the adjustment system 144 to control the orientation(s) of multiple pairs of permanent bar magnets 140 per rotor pole provides even greater control flexibility for these particular designs of the permanent magnet motor 128.

Figure 4:
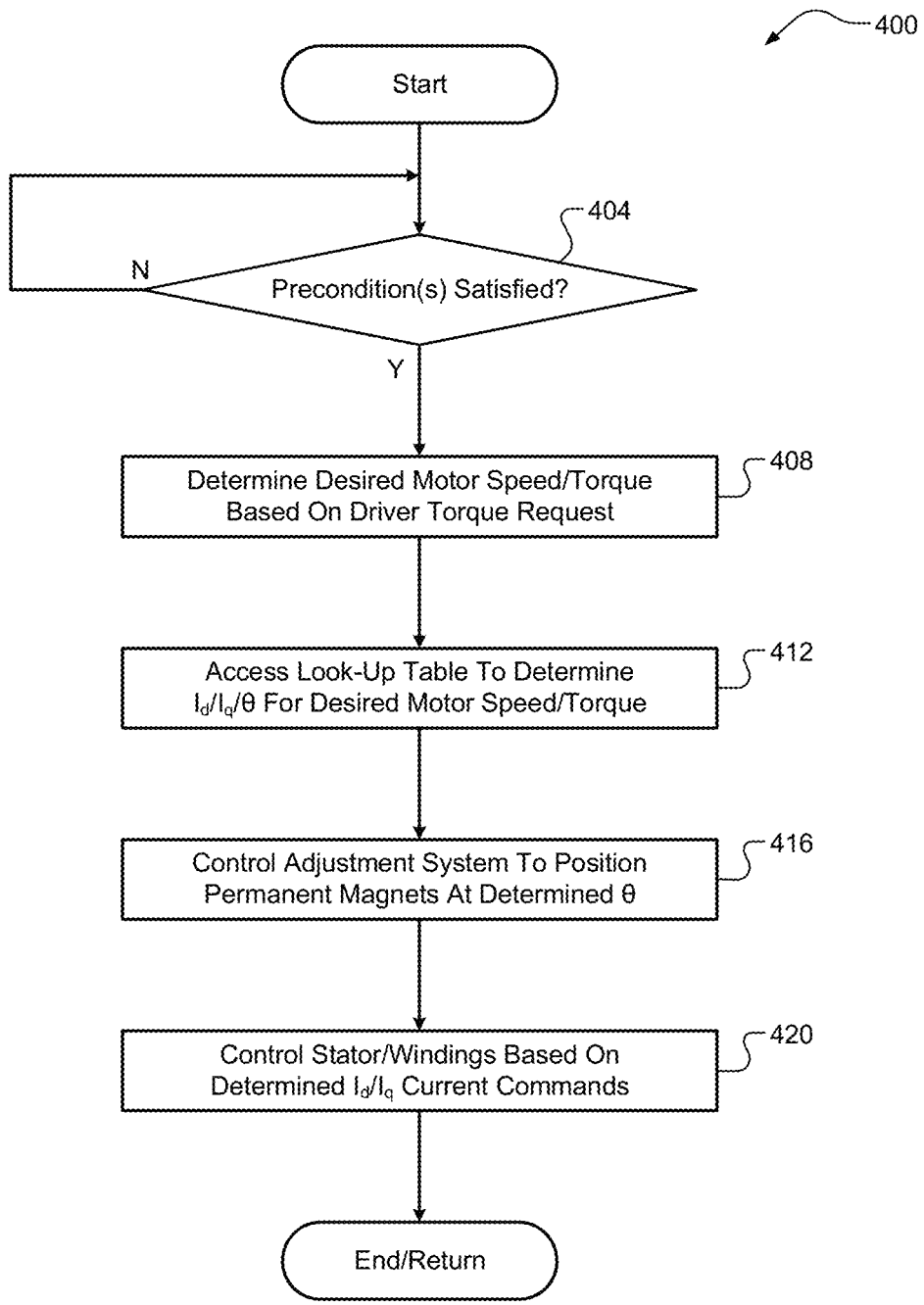
FIG. 4 is a flow diagram of an example method for dynamic control of orientations of permanent magnet motor bar magnets for a vehicle according to the principles of the present application.

Referring now to FIG. 4, a flow diagram of an example method 400 for dynamic control of orientations of permanent magnet motor bar magnets for a vehicle according to the principles of the present application. While the permanent magnet motor 128 of vehicle 100 and their subcomponents are specifically referenced for illustrative/descriptive purposes, it will be appreciated that this method 400 could be applicable to any suitably configured permanent magnet motor. At optional 404, the controller 112 may initially determine whether a set of one or more preconditions are satisfied. These precondition(s) could include, for example only, the vehicle 100 being powered up and running and there being no malfunctions or faults present that would otherwise inhibit or prevent operation of the techniques of the present application. When false, the method 400 ends or returns to 404. When true, the method 400 proceeds to 408. At 408, the controller 112 determines a desired speed and torque for the electric motor system 124. This could be based on, for example, a driver torque request provided by a driver of the vehicle 100 via the driver interface 116.

Depending on the configuration of the electrified powertrain 104, it will be appreciated that the determination of the desired speed/torque for the electric motor system 124 could include some sort of distribution or allocation of the entire powertrain driver torque request to the electric motor system 124 as well as other components, such as other electric motors and/or an internal combustion engine. At 412, the controller 112 accesses the look-up table to determine a combination of ($I_d$, $I_q$, θ) values that satisfy desired motor efficiency/NVH goals or targets. This could include, for example, one or both of the previously-described targets (i.e., reduced field weakening control of $I_d$ for more efficient high speed operation and/or reduced NVH via $I_d$/$I_q$/θ optimization). The goals/targets could be, for example, minimized NVH and field weakening control, thereby maximizing motor efficiency and mitigating or eliminating NVH. At 416, the controller 112 controls the adjustment system 144 based on the determined V-angle θ. This could include positioning the permanent magnets 140a, 140b at the determined V-angle θ or as close to the determined angle θ as the adjustment system 144 permits. Finally, at 420, the controller 112 controls the permanent magnet motor 128 (e.g., currents supplied to electromagnetic coils of the stator 132) based on the determined $I_d$/$I_q$. The method 400 then ends or returns to 404 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electric motor system for a vehicle, the electric motor system comprising:
   a permanent magnet motor comprising:
      a stator defining a stator axis and having a plurality of electromagnetic coils each configured to, in response to a current, generate a magnetic field; and
      a rotor having N pairs of permanent bar magnets arranged therein and configured to rotate about the stator axis in response to the generated magnetic field(s), wherein each pair of the N pairs of permanent bar magnets are arranged in a V-angle configuration defining a V-angle (θ) therebetween and corresponding to one of N rotor poles, and wherein N is greater than one;
   an adjustment system configured to adjust the V-angle between each pair of the N pairs of permanent bar magnets between at least a first V-angle ($θ_1$) and a different second V-angle ($θ_2$); and
   a controller configured to control the permanent magnet motor and the adjustment system based on a predetermined speed and predetermined torque for the electric motor system to (i) mitigate noise, vibration, and/or harshness (NVH) of the permanent magnet motor and (ii) improve efficiency of the permanent magnet motor at high speed operating regions or improve torque of the permanent magnet motor at low speed operating regions.

2. The electric motor system of claim 1, wherein the adjustment system includes a hydraulic system where a pressure of a hydraulic fluid selectively actuates one or more hydraulic actuators to adjust the V-angle θ between a particular pair of the N pairs of permanent bar magnets.

3. The electric motor system of claim 2, wherein when actuated, the one or more hydraulic actuators move the particular pair of permanent bar magnets from the first V-angle $\theta_1$ to the second V-angle $\theta_2$, and wherein the adjustment system further includes a pair of return springs that, when the one or more hydraulic actuators are not actuated, move the particular pair of permanent bar magnets from the second V-angle $\theta_2$ back to the first V-angle $\theta_1$, balanced by centrifugal forces at an operating speed of the rotor.

4. The electric motor system of claim 2, wherein the adjustment system is configured to adjust the V-angle between each pair of the N pairs of permanent bar magnets between three or more different angles.

5. The electric motor system of claim 4, wherein the three or more different angles allow for the adjustment system to achieve at least one asymmetric pair of rotor poles.

6. The electric motor system of claim 2, wherein the N pairs of permanent bar magnets are arranged in (N*2) respective cavities defined by the rotor, wherein each cavity is filled with air, the hydraulic fluid, or a combination thereof.

7. The electric motor system of claim 1, wherein the controller is further configured to:
  access a look-up table relating (i) a plurality of combinations of direct current commands ($I_d$), quadrature current commands ($I_q$), and V-angles for achieving the predetermined speed and torque by the electric motor system and (ii) for each of the plurality of combinations, an expected NVH of the permanent magnet motor;
  select, from the look-up table, one of the plurality of $I_d/I_q/\theta$ combinations corresponding to a reduced NVH of the permanent magnet motor; and
  control the permanent magnet motor and the adjustment system based on the selected $I_d/I_q/\theta$ combination.

8. The electric motor system of claim 7, wherein during high speed operation of the permanent magnet motor above a speed threshold, the controller is configured to select and utilize the selected $I_d/I_q/\theta$ combination to reduce an overall effective magnetic field of the permanent magnet motor and thereby reduce field weakening control by the direct current command $I_d$ and increase the efficiency of the permanent magnet motor, and output torque commensurately.

9. The electric motor system of claim 7, wherein during low speed operation of the permanent magnet motor below a low speed threshold, the controller is configured to select and utilize the selected $I_d/I_q/\theta$ combination to increase the torque generated by the permanent magnet motor.

10. The electric motor system of claim 9, wherein the controller is configured to increase the torque generated by the permanent magnet motor during the low speed operation.

11. A method for dynamic control of orientations of permanent bar magnets arranged in a rotor of a permanent magnet motor of a vehicle, the method comprising:
  providing a permanent magnet motor comprising:
    a stator defining a stator axis and having a plurality of electromagnetic coils each configured to, in response to a current, generate a magnetic field; and
    a rotor having N pairs of permanent bar magnets arranged therein and configured to rotate about the stator in response to the generated magnetic field(s), wherein each pair of the N pairs of permanent bar magnets are arranged in a V-angle configuration defining a V-angle (θ) therebetween and corresponding to one of N rotor poles, and wherein N is greater than one;
  providing an adjustment system configured to adjust the V-angle θ between each pair of the N pairs of permanent bar magnets between at least a first V-angle ($\theta_1$) and a different second V-angle ($\theta_2$); and
  controlling, by a controller of the vehicle, the permanent magnet motor and the adjustment system based on a predetermined speed and predetermined torque for the electric motor system to (i) mitigate noise, vibration, and/or harshness (NVH) of the permanent magnet motor and (ii) improve efficiency of the permanent magnet motor at high speed operating regions or improve a torque generated by the permanent magnet motor at low speed operating regions.

12. The method of claim 11, wherein the adjustment system includes a hydraulic system where a pressure of a hydraulic fluid selectively actuates one or more hydraulic actuators to adjust the V-angle θ between a particular pair of the N pairs of permanent bar magnets.

13. The method of claim 12, wherein when actuated, the one or more hydraulic actuators move the particular pair of permanent bar magnets from the first V-angle $\theta_1$ to the second V-angle $\theta_2$, and wherein the adjustment system further includes a pair of return springs that, when the one or more hydraulic actuators are not actuated, move the particular pair of permanent bar magnets from the second V-angle $\theta_2$ back to the first V-angle $\theta_1$, balanced by centrifugal forces at an operating speed of the rotor.

14. The method of claim 12, wherein the adjustment system is configured to adjust the V-angle between each pair of the N pairs of permanent bar magnets between three or more different angles.

15. The method of claim 14, wherein the three or more different angles allow for the adjustment system to achieve at least one asymmetric pair of rotor poles.

16. The method of claim 12, wherein the N pairs of permanent bar magnets are arranged in (N*2) respective cavities defined by the rotor, wherein each cavity is filled with air, the hydraulic fluid, or a combination thereof.

17. The method of claim 12, further comprising:
  accessing, by the controller, a look-up table relating (i) a plurality of combinations of direct current commands ($I_d$), quadrature current commands ($I_q$), and V-angles for achieving the predetermined speed and torque by the electric motor system and (ii) for each of the plurality of combinations, an expected NVH of the permanent magnet motor;
  selecting, by the controller and from the look-up table, one of the plurality of $I_d/I_q/\theta$ combinations corresponding to a reduced NVH of the permanent magnet motor; and
  controlling, by the controller, the permanent magnet motor and the adjustment system based on the selected $I_d/I_q/\theta$ combination.

18. The method of claim 17, wherein during high speed operation of the permanent magnet motor above a speed threshold, the controller is configured to select and utilize the selected $I_d/I_q/\theta$ combination to reduce an overall effective magnetic field of the permanent magnet motor and thereby reduce field weakening control by the direct current command $I_d$ and increase the efficiency of the permanent magnet motor, and output torque commensurately.

19. The method of claim 17, wherein during low speed operation of the permanent magnet motor below a low speed threshold, the controller is configured to select and utilize the selected $I_d/I_q/\theta$ combination to increase the torque generated by the permanent magnet motor.

20. The method of claim 19, wherein the controller is configured to increase the torque generated by the permanent magnet motor during the low speed operation.

* * * * *